(12) United States Patent
Van Der Salm

(10) Patent No.: US 6,343,220 B1
(45) Date of Patent: Jan. 29, 2002

(54) MULTIMODE TELECOMMUNICATION TERMINAL DEVICE

(75) Inventor: Peter Van Der Salm, Utrecht (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/254,599

(22) Filed: Jun. 28, 1999

(30) Foreign Application Priority Data

Sep. 12, 1996 (EP) ............................................. 96202543

(51) Int. Cl.⁷ ................................................. H04B 1/38
(52) U.S. Cl. ....................... 455/552; 455/422; 455/424; 455/426; 455/553; 455/557
(58) Field of Search ................................. 455/552, 553, 455/557, 422, 424, 426, 445, 463, 464, 465; 370/359, 463, 338, 401, 466, 467, 469

(56) References Cited

U.S. PATENT DOCUMENTS

| | | | |
|---|---|---|---|
| 5,787,076 A | * | 7/1998 | Anderson et al. ............ 370/294 |
| 5,815,809 A | * | 9/1998 | Ward et al. .................. 455/428 |
| 5,894,595 A | * | 4/1999 | Foladere et al. ............. 455/414 |
| 5,903,618 A | * | 5/1999 | Miyake et al. ............... 375/356 |
| 5,913,163 A | * | 6/1999 | Johansson et al. .......... 455/426 |
| 5,915,224 A | * | 6/1999 | Jonsson ....................... 455/552 |
| 5,946,616 A | * | 8/1999 | Schornack et al. .......... 455/422 |
| 5,983,100 A | * | 11/1999 | Johansson et al. .......... 455/426 |
| 6,011,978 A | * | 1/2000 | Ault et al. ................... 455/552 |
| 6,021,332 A | * | 2/2000 | Alberth, Jr. et al. ........ 455/552 |
| 6,044,267 A | * | 3/2000 | Foladare et al. ............ 455/426 |
| 6,229,792 B1 | * | 5/2001 | Anderson et al. ........... 370/280 |

FOREIGN PATENT DOCUMENTS

| | | |
|---|---|---|
| EP | 0 660 628 | 6/1995 |
| GB | 2 225 512 | 5/1990 |
| WO | 94/17639 | 8/1994 |
| WO | 95/01070 | 1/1995 |
| WO | 95/23485 | 8/1995 |
| WO | 96/18270 | 6/1996 |

* cited by examiner

Primary Examiner—Thanh Cong Le
Assistant Examiner—Yemane Woldetatios
(74) Attorney, Agent, or Firm—Burns, Doane, Swecker & Mathis, L.L.P.

(57) ABSTRACT

A multimode telecommunication terminal device has a plurality of interfaces for accessing a plurality of wired and/or wireless telecommunication networks from a plurality of subscriber telecommunication terminal units, and control means operatively connected to the interfaces. The control means include switching means arranged to operatively interconnect the interfaces such as to provide access to the plurality of wireless networks via corresponding wireless subscriber terminal units operatively connected to a corresponding interface. The terminal device may include a radio interface including a radio access unit or radio base station, in particular a radio access unit operating in accordance with a cordless radio communication standard such as the Digital Enhanced Cordless Telecommunications (DECT) standard.

13 Claims, 3 Drawing Sheets

MULTIMODE TELECOMMUNICATION TERMINAL DEVICE

FIELD OF THE INVENTION

The present invention relates generally to telecommunication systems and, more specifically, to multi-mode telecommunication terminal devices arranged for accessing a plurality of different telecommunication systems or networks.

BACKGROUND OF THE INVENTION

Due to the deregulation of the telecommunications market, at present telecommunication services such as telephony are provided by a number of different operators using the same and/or separate telecommunication networks.

Wireline telephone communication is mainly provided by the established telecommunication operators via the Public Switched Telephone Network (PSTN). Besides wireline communication these operators also provide wireless or mobile communication over special radio telecommunication networks such as the well known analogue cellular radio telephone networks designated AMPS, ETACS, NMT-450 and NMT-900 which have been deployed throughout the world, and/or digital radio cellular systems such as designated IS-54B in North America and the pan-European Global System for Mobile telecommunications (GSM). New operators mainly provide public telecommunication services over such cellular radio telecommunication systems. These systems, and others, are described, for example, in the book titled "Cellular Radio Systems", by Balston et al., published by Artech House, Norwood, Mass., 1993.

A special form of radio telecommunication is called cordless communication, ranging from simple residential cordless telephones to business cordless systems capable of serving hundreds or even thousands of cordless communication units across (large) offices, production halls etc. Analogue cordless telephones are designated CT0, CT1 and CT1+. Digital cordless systems are designated CT2, CT2-CAI, CT3, PHS and DECT (Digital Enhanced Cordless Telecommunications). CT3, PHS and DECT use TDMA (Time Division Multiple Access) as their transmission technique, whereas CT2 operates under FDMA (Frequency Division Multiple Access). Besides these access techniques, in particular in North America, spread spectrum access is used for cordless communication. CDMA (Code Division Multiple Access) is another digital access technique which can be used for cordless communication. An elaborated discussion on DECT can be found in a paper by D. Akerberg, "Novel Radio Access Principles Useful for the Third Generation Mobile Radio Systems", The Third IEEE International Symposium on Personal, Indoor and Mobile Radio Communication, Boston Mass., Oct. 19–21, 1992.

In particular the digital cordless telecommunication systems have been proven to be very suitable for providing telecommunication services over Cable TeleVision (CaTV) networks and to provide a type of Personal Communication Services (PCS) or also called Cordless Terminal Mobility (CTM). This is basically a mobile telecommunication service that covers a whole town or city. Customers of this service are able to carry their mobile communication units (e.g. telephone handsets) with them and can make calls in the coverage area of the service. It will be appreciated that such new telecommunication systems provide new operators an excellent opportunity to operate telecommunication services over other networks than the PSTN such as CaTV networks, power cables, etc. and, of course, through the air.

In future, a user will subscribe to those telecommunication systems which best meet his/her demands for communication and, of course, with such operator providing the most attractive price and/or grade of service, for example. Accordingly, a particular user can have a PSTN subscription from operator X, a GSM subscription from operator Y and a CTM subscription from operator Z, for example.

Although there is trend to integration of, for example, radio telephone terminals arranged for multi-mode operation, such as disclosed by GB-A-2,225,512, i.e. a single radio telephone terminal capable of accessing a particular network operating in accordance with a particular mode, such as GSM or DECT, in practice among subscribers there will be a need to access a particular network or telecommunication system or mode using either one of the single mode telecommunication subscriber terminals available to him/her. This, for example, to always benefit from the most cost effective mode of communication in a particular case.

Besides the subscribers, it is also very advantageous for operators to have an opportunity to force subscribers to use a particular network or system (i.e. mode) for example in case of network problems, to levitate the use of a particular network during busy hours in such network, etc.

International patent application WO 95/23485 discloses a so-called "multi-mode communication system", comprising a base unit having transceiver and control means to place telephone calls according to any of the known radio communication standards such as GSM, PCH, AMPS, NMT450, CT1/CT2/CT3 etc. Communication through either one of these radio protocols can be established from a cordless or cellular handset connecting to the base unit. The base unit has several built-in radio transceiver and control means for connection to the different radio telecommunication networks, rendering the unit relatively expensive and technically complex.

EP-A-0,660,628 and WO 94/17639 disclose radio telephone equipment for connecting a cellular (GSM) telephone terminal to the fixed telephone network (PSTN). Accordingly, services such as handsfree calling, provided by the cellular telephone, can be used with the wired network. The equipment (e.g. an adapter) can connect the cellular phone by a wired or wireless linkon and may also be integrated into the cellular phone. However, access of the cellular network from a different wireless communication system or equipment such as a cordless subscriber terminal, for example, is not disclosed nor suggested.

SUMMARY OF THE INVENTION

It is an object of the present invention to present a cost effective and easy to implement solution for an integral provision of telecommunication modes and services provided to a subscriber via a plurality of wired and wireless networks.

It is a further object of the present invention to present a cost effective and easy to implement solution for an integral provision of telecommunication modes and services provided to a subscriber over a plurality of networks operated by the same or a plurality of separate operators.

According to the present invention there is provided a multimode telecommunication terminal device, comprising a plurality of interfaces for accessing a plurality of wired and/or wireless telecommunication networks from a plurality of subscriber telecommunication terminal units, and control means operatively connected to these interfaces, the control mean comprise switching means. The terminal device according to the invention is characterized in that the switching means operatively interconnect the interfaces to provide access to the plurality of wireless networks via corresponding wireless subscriber terminal units operatively connected to a corresponding interface.

The multi-mode telecommunication terminal device of the invention provides the interconnection at the subscriber end of several telecommunication networks, such as but not limited to wireline networks, cellular radio communication networks and cordless telecommunication networks.

Access to the wireless networks is advantageously provided using the radio transceiver and control means available in the several subscriber radio terminal units (e.g. mobile and/or portable radio telephones) if connected to the corresponding interface of the multi-mode telecommunication terminal device.

The present invention provides interconnection of networks at the subscribers' end, such that calls from and towards the subscriber end are routed through the several networks or telecommunications systems available to a user.

With the device according to the invention, the operators need not to develop or invest in (additional) switching and transceiver and radio control means at the network sides in order to access networks or to route calls through the several networks, which would require additional communication links and means.

In an embodiment of the terminal device according to the invention, in order to route calls through the networks available to a subscriber, the switching means comprise processing means arranged for processing signaling information from at least one of the interfaces, the signaling information being indicative of the access to a particular network. Accordingly, by signal information received at the terminal device a required interconnection of networks can be established.

The interfaces of the terminal device may comprise network interfaces for the connection of networks and terminal interfaces for the connection of subscriber terminal units, such as telephone units. The signaling information may be generated by an operator, for example, and received through a network interface and/or generated by the subscriber and received through a terminal interface, for example. In the latter case appropriate signaling information may be generated either automatically or manually such to establish, in each case, a least cost routing of a call through one of the available networks or to give preference to a particular operator or network. With such signaling information, operators can force a call to be placed through the cellular network, for example, in case the wireline network is overloaded, or to provide certain services to a subscriber which are available in the one but not in the other network.

It will be appreciated that the terminal device according to the invention provides a very flexible and cost effective solution to both the subscribers and the operators to gain maximum benefit from the subscriber equipment and networks available.

In a preferred embodiment, an interface of the terminal device according to the invention comprises a radio access unit, in particular a radio access unit operating in accordance with a cordless radio communication standard such as the Digital Enhanced Cordless Telecommunications (DECT) standard.

With this embodiment, at the subscriber premises, calls can be received and placed through the cordless interface, whereas the subscriber may select either one of, for example, the PSTN wireline network or a cellular radio network to complete a call with a remote subscriber.

In a very advantageous embodiment, the multi-mode terminal device of the present invention comprises a terminal interface arranged for receiving a wireless subscriber unit, such as a cellular radio telephone terminal unit, for example a GSM telephone handset. By connecting a cellular telephone to this terminal interface the cellular telephone can be used as the interface to the cellular network without requiring cellular transceiver and communication control means in the multi-mode terminal device itself.

Instead of a cellular radio terminal unit the wireless terminal interface may be arranged to operate with any other radio terminal unit providing access to a network, such as but not limited to a CTM network, for example, operating under the DECT standard.

The above-mentioned and other features and advantageous of the invention are illustrated in the following description with reference to the enclosed drawings.

DETAILED DESCRIPTION OF THE EMBODIMENTS

Figure 1:
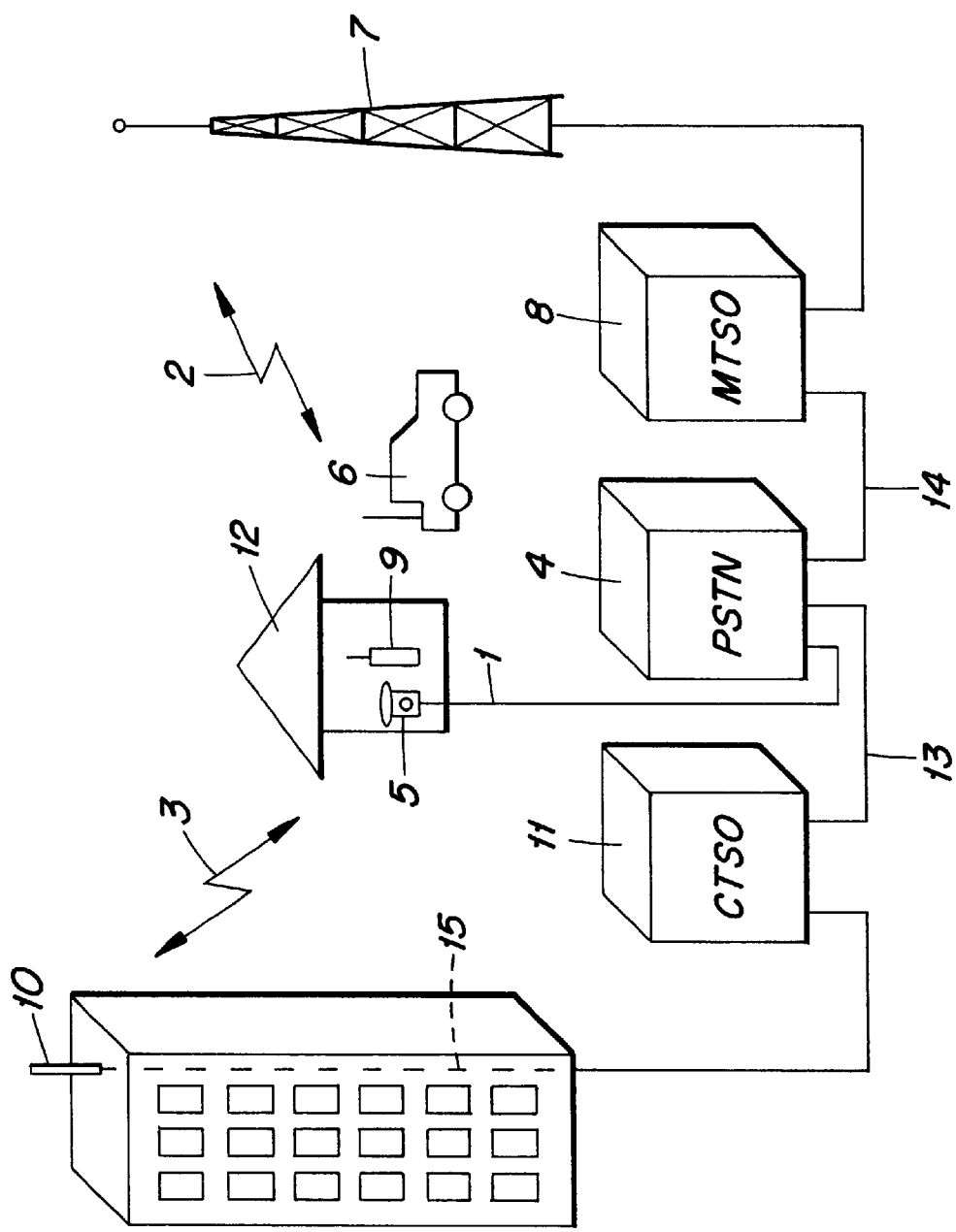
FIG. 1 shows, in a schematic and illustrative manner, a multi-mode telecommunications environment.

FIG. 1 shows a typical multi-mode telecommunications environment, comprising a wired telecommunication network 1, a cellular radio telecommunication network 2 and a cordless radio telecommunication network 3.

In the wireline network 1 each subscriber 5 is by wire fixedly connected to the so-called Public Switched Telecommunication Network (PSTN) 4. In the cellular network 2, such as the Global System for Mobile telecommunications (GSM), the subscribers 6 connect via remote radio towers 7 to a so-called Mobile Telephone Switching Office (MTSO) 8. In a cordless radio telecommunication system 3, such as designated Cordless Terminal Mobility (CTM), a subscriber 9 connects through an antenna 10 in its neighbourhood to a Cordless Terminal Switching Office (CTSO) 11, for example. The MTSO 8 and the CTSO 11 both connect via wirelines 13, 14 to the PSTN 4 for completing calls to wireline subscribers. The CTM network may operate in accordance with the Digital Enhanced Cordless Telecommunications (DECT) standard, for example. The antenna 10 may connect to the CTSO 11 via a Cable TeleVision (CaTV) network 15, for example.

Accordingly, from the subscriber premises 12, a plurality of telecommunications networks or modes can be accessed each having its own particularities in terms of charges, services, communication capacity, busy hours, range etc. The several communication modes can be provided by the same or different operators.

Figure 2:
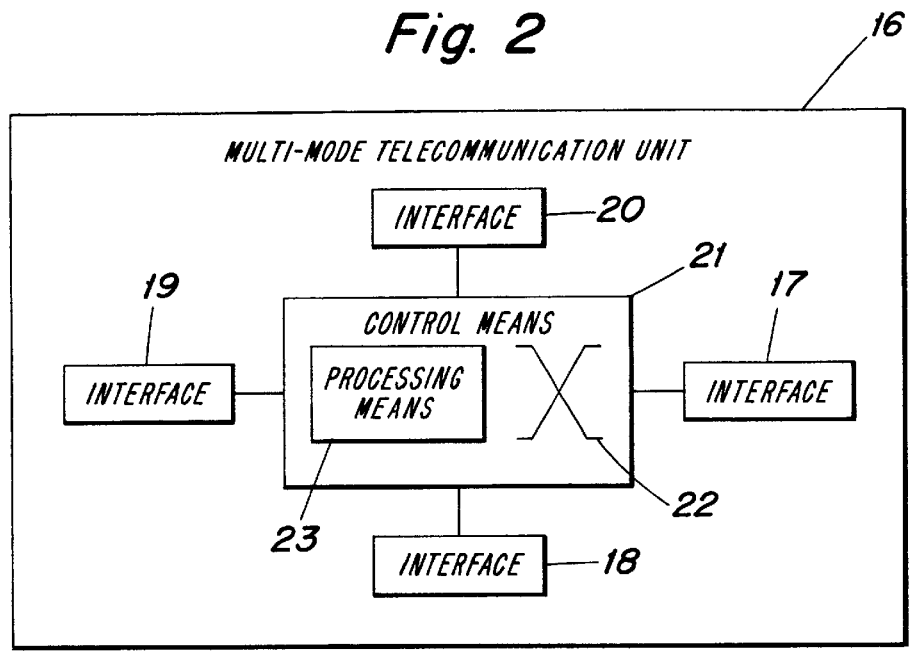
FIG. 2 shows, in a schematic and illustrative manner, an embodiment of the multi-mode telecommunication terminal unit according to the present invention.

FIG. 2 shows a first embodiment of a multi-mode telecommunication terminal unit 16 according to the present invention. The terminal unit 16, in the embodiment shown, comprises four interface means, in the remainder referred to as interfaces, which are consecutively numbered 17, 18, 19 and 20. Each interface connects to control means 21 which comprise switching means as schematically illustrated by a cross 22.

The interfaces may be arranged such that interface 17 can be connected to the wireline network 1, while interface 18 may provide access to a cellular network 2 and interface 19 provides access to a cordless communication network 3. Interface 20 may provide access to a private cordless telephone network to be used at the subscriber premises. It will be appreciated that not all the interfaces shown have to be present, this depending on the availability of a particular telecommunication mode or network, for example. On the other hand, in case of a plurality of separate wireline networks and/or several cellular and/or cordless radio networks available to a user even more interfaces may be required.

The interfaces 17, 18, 19, 20 may comprise network interfaces for the connection of a telecommunication network, such as a connector means for connection to the PSTN, and terminal interfaces for connecting a terminal unit, such as a connector means for receiving a portable radio handset, a wired telephone set and/or other terminal devices serving the communication needs of a subscriber.

In a further embodiment of the invention, the control means 21 comprise processing means 23, such as a microprocessor, arranged to process signaling information from one or the plurality of interfaces 17, 18, 19, 20. The signaling information comprising information as to the required interconnection of interfaces 17, 18, 19, 20.

Figure 3:
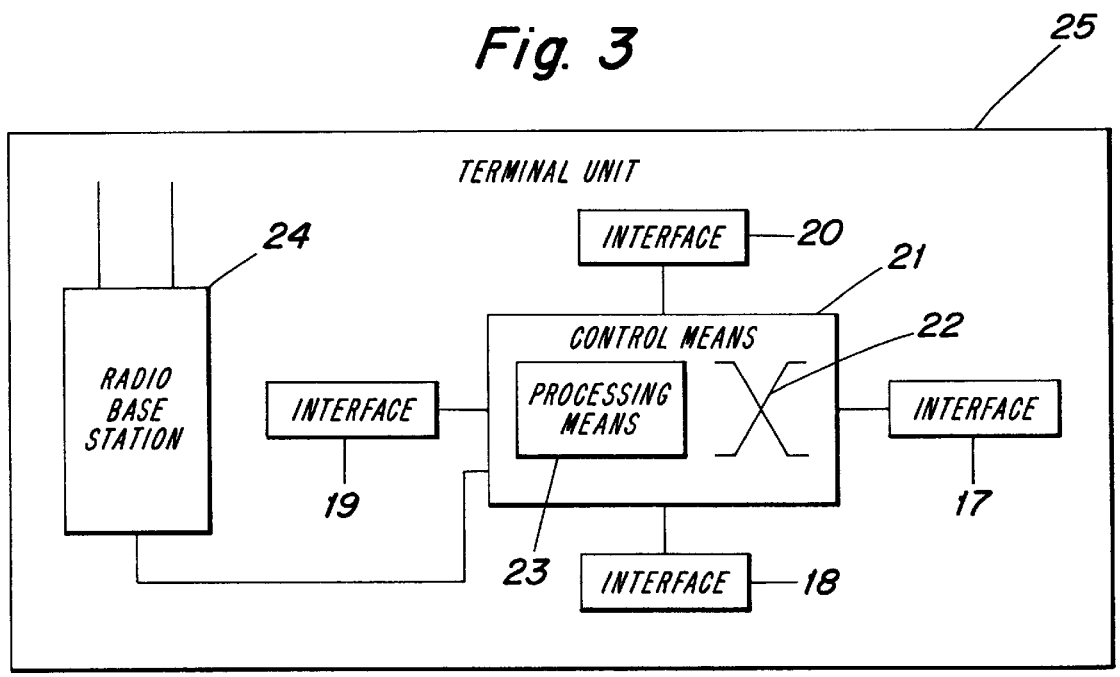
FIG. 3 shows, in a schematic and illustrative manner, a further embodiment of the multi-mode telecommunication terminal unit according to the present invention.

In an embodiment of the invention as shown in FIG. 3, the multi-mode terminal unit 16 comprises a radio access unit or radio base station 24 operating under a cordless radio communication standard such as DECT, for example. The access unit 24 connects, in the embodiment shown, to the control means 21. Through the access unit 24 a user can place cordless telephone or data calls through a cordless handset while having the opportunity to route such calls via either the PSTN or the GSM network, for example.

Figure 4:
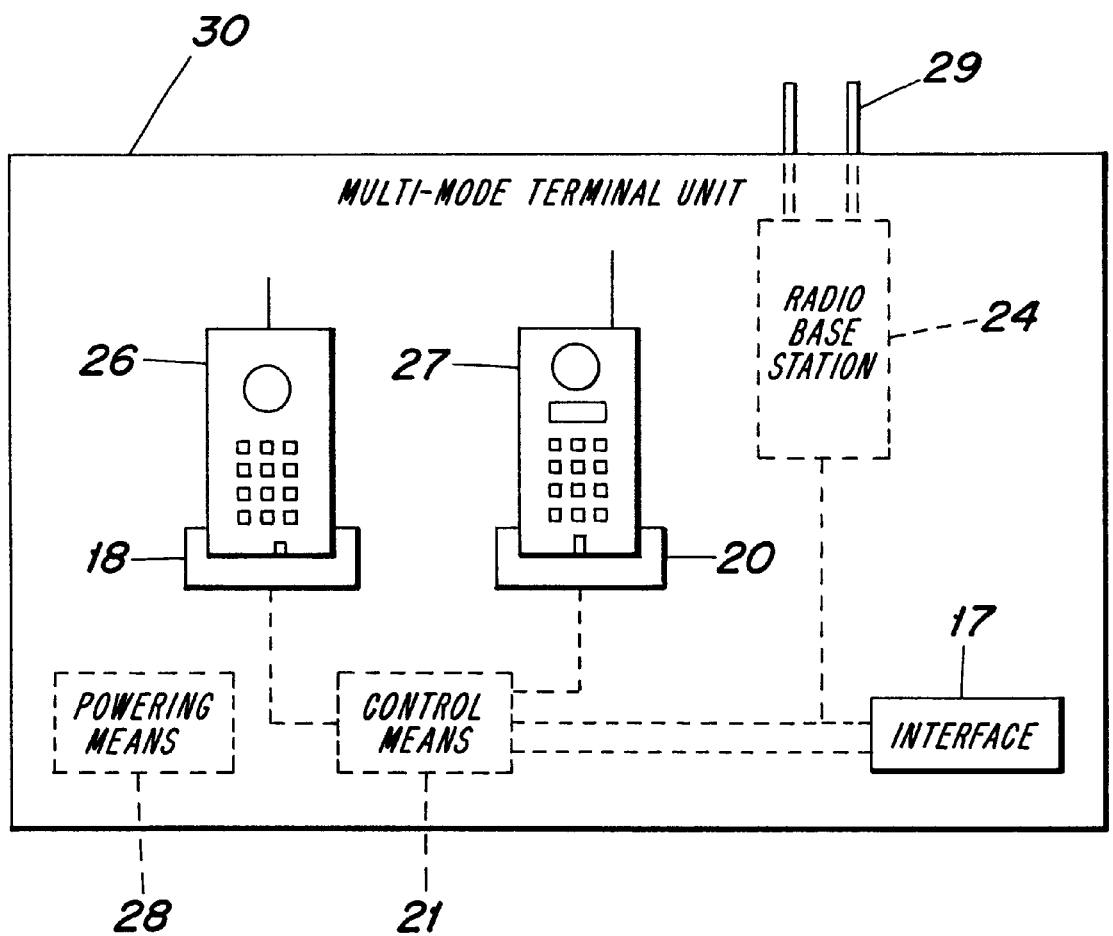
FIG. 4 shows, in a schematic and illustrative manner, a preferred embodiment of the multi-mode telecommunication terminal unit according to the present invention.

In a preferred embodiment of the multi-mode terminal unit 30 as shown in FIG. 4, which is based on the terminal unit 25 shown in FIG. 3, the interface 18 is a terminal interface taking the form of a so-called docking slot comprising connector means (not shown) for receiving a cellular portable telephone handset 26, for example a GSM handset. The interface 17 comprises a network interface for wireline connection to the PSTN 1 and the interface 20 is also arranged as a terminal interface comprising a docking slot having a connector (not shown) for receiving a portable cordless telephone 27, for example a DECT handset, for operation in conjunction with the radio access unit 24. The multi-mode terminal unit 30 additionally comprises powering means 28, shown in broken lines, which are connected to the docking slots 18 and 20, among others for charging of the handsets 26 and 27. The radio access unit 24 may also connect directly to the PSTN via the interface 17, as shown with broken lines.

In operation, the multi-mode telecommunication terminal unit 30 is positioned at the user premises 12 (see FIG. 1) and the subscriber can use his cordless handset 27 for communication while he or she is in the range of the radio access unit 24. In the case of a DECT cordless system the user can place calls within a range of 300–500 m from the air interface 29 of the radio access unit 24. In the case of a subscription to a CTM network operating under DECT, for example, the radio access unit 24 may (additionally) comprise a repeater functionality.

Under the assumption that the user has a subscription to both a cellular and a wireline network, for example, the user can select the network over which a call is to be completed by an appropriate setting of the control means 21. In the case of a call via the cellular network, the transceiver and communication control means already available in the cellular handset 26 are used to set up, maintain and brake a cellular radio link between the handset 26 and the MTSO 8 (see FIG. 1). Note that the user does not hold the cellular handset 26 but the cordless handset 27. However, the user may also select the wireline network via the interface 17 to complete the call. Accordingly, with the multi-mode terminal unit according to the invention the user can access both the wireline and the cellular network via one and the same handset 27.

Instead of the user, a network operator can also urge, e.g. by default, to complete calls over a particular network, for example during busy hours in the one network while the other network is less loaded. By transmitting appropriate signaling information to the control means 21, an operator can set the network to be chosen. Dependent on the particular embodiment, the user may also be provided with a network selection option, either manually via the keyboard of a handset 26 or 27, or automatically wherein the control means are arranged to select a network dependent on the time of the day, the service required, the load of a particular network, whether a cellular handset is inserted in the slot 20 etc.

It will be appreciated by those skilled in the art that, with the multi-mode telecommunication terminal unit according to the present invention a very flexible, cost efficient tool is provided for an integral use of communication networks, both from the user as well from the operators perspective, and which can be manufactured by using appropriate equipment generally available on the market.

What is claimed is:

1. A multimode telecommunication terminal device, comprising a plurality of interfaces for accessing a plurality of wired and/or wireless telecommunication networks from a plurality of subscriber telecommunication terminal units, and control means operatively connected to said interfaces, said control means comprise switching means which operatively interconnect said interfaces to provide access to said plurality of wireless networks via corresponding wireless subscriber terminal units operatively connected to a corresponding interface, wherein said switching means enables any of said interfaces to be coupled to any other of said interfaces, whereby an interconnection of networks is provided at the multimode telecommunication terminal device.

2. A multimode telecommunication terminal device, comprising a plurality of interfaces for accessing a plurality of wired and/or wireless telecommunication networks from a plurality of subscriber telecommunication terminal units, and control means operatively connected to said interfaces, said control means comprise switching means which operatively interconnect said interfaces to provide access to said plurality of wireless networks via corresponding wireless subscriber terminal units operatively connected to a corresponding interface, wherein said switching means comprise processing means arranged for processing signaling information from at least one of said interfaces, said signaling information being indicative of the access to a particular network.

3. A multimode telecommunication terminal device according to claim 1, wherein said interfaces comprise network interfaces for the connection of telecommunication networks and terminal interfaces for the connection of subscriber terminal units.

4. A multimode telecommunication terminal device according to claim 3, wherein at least one terminal interface is arranged to receive a cordless radio telecommunication terminal unit, in particular a cordless radio telecommunication terminal unit operating in accordance with the DECT standard.

5. A multimode telecommunication terminal device according to claim 3, wherein at least one terminal interface is arranged to receive a cellular radio telecommunication terminal unit, in particular a cellular radio telecommunication unit operating in accordance with the Global System for Mobile communications (GSM) standard.

6. A multimode telecommunication terminal device according to claim 3, comprising a wireline network interface for the connection of a wireline telecommunication network such as the Public Switched Telephone Network (PSTN).

7. A multimode telecommunication terminal device according to claim 1, comprising a radio interface including a radio access unit, in particular a radio access unit operating in accordance with a cordless radio communication standard such as the Digital Enhanced Cordless Telecommunications (DECT) standard.

8. A multimode telecommunication terminal device according to claim 7, wherein said radio access unit connects to said wireline interface.

9. A multimode telecommunication terminal device according to claim 1, comprising means for providing electric power to an interface, in particular for providing charging power to a terminal interface for receiving a wireless subscriber terminal unit.

10. A multimode telecommunication terminal device according to claim 1, wherein said switching means comprise processing means arranged for processing signaling information from at least one of said interfaces, said signaling information being indicative of the access to a particular network.

11. A multimode telecommunication terminal device according to claim 2, wherein said processing means are arranged for processing signaling information received from at least one of said wired and/or wireless telecommunication networks via at least one of said interfaces.

12. A system comprising:

a plurality of wired and/or wireless telecommunication networks; and a multimode telecommunication terminal device, comprising a plurality of interfaces for accessing said plurality of wired and/or wireless telecommunication networks from a plurality of subscriber telecommunication terminal units, and control means operatively connected to said interfaces, said control means comprising switching means which operatively interconnect said interfaces to provide access to said plurality of wireless networks via corresponding wireless subscriber terminal units operatively connected to a corresponding interface, wherein said switching means comprise processing means arranged for processing signaling information received from at least one of said wired and/or wireless telecommunication networks via at least one of said interfaces, said signaling information being indicative of the access to a particular network, and wherein said at least one of said wired and/or wireless telecommunication networks includes means for generating said signaling information and for sending said signaling information to said multimode telecommunication terminal.

13. A system according to claim 12, wherein said switching means enables any of said interfaces to be coupled to any other of said interfaces, whereby an interconnection of networks is provided at the multimode telecommunication terminal device.

* * * * *